United States Patent [19]
Zeller et al.

[11] Patent Number: 5,544,634
[45] Date of Patent: Aug. 13, 1996

[54] METHOD AND ARRANGEMENT FOR CONTROLLING AN INTERNAL COMBUSTION ENGINE

[75] Inventors: Thomas Zeller, Ditzingen; Detlev Zieger, Markgröningen; Günter Hönig, Ditzingen, all of Germany

[73] Assignee: Robert Bosch GmbH, Stuttgart, Germany

[21] Appl. No.: 158,470

[22] Filed: Nov. 29, 1993

[30] Foreign Application Priority Data

Nov. 27, 1992 [DE] Germany .............. 42 39 842.8

[51] Int. Cl.⁶ .................. F02D 9/02; F02D 41/18
[52] U.S. Cl. .......................... 123/399; 123/337
[58] Field of Search .................. 123/399, 403, 123/436, 184.54

[56] References Cited

U.S. PATENT DOCUMENTS

| | | | |
|---|---|---|---|
| 4,452,200 | 6/1984 | Tsutsumi et al. | 123/339 |
| 4,571,990 | 2/1986 | Hönig | 73/118.2 |
| 4,688,535 | 8/1987 | Küttner et al. | 123/436 |
| 4,691,670 | 9/1987 | Bonisch et al. | 123/403 |
| 4,796,584 | 1/1989 | Goto et al. | 123/403 |
| 5,080,065 | 1/1992 | Momura et al. | 123/403 |

Primary Examiner—Andrew M. Dolinar
Attorney, Agent, or Firm—Walter Ottesen

[57] ABSTRACT

The invention is directed to a method and an arrangement for controlling an internal combustion engine wherein the air flow to the engine is influenced at least in component ranges and in a selectable time reference to operations in the engine.

10 Claims, 11 Drawing Sheets

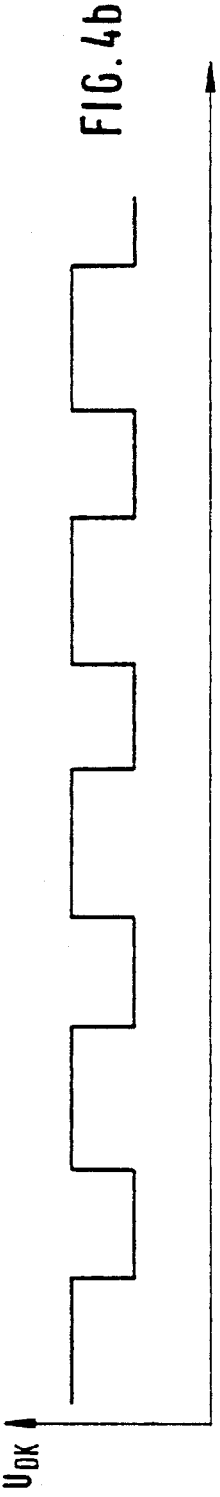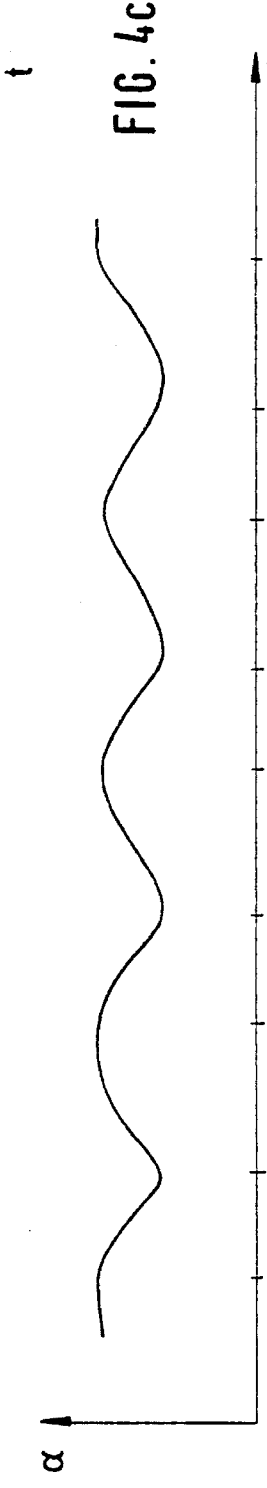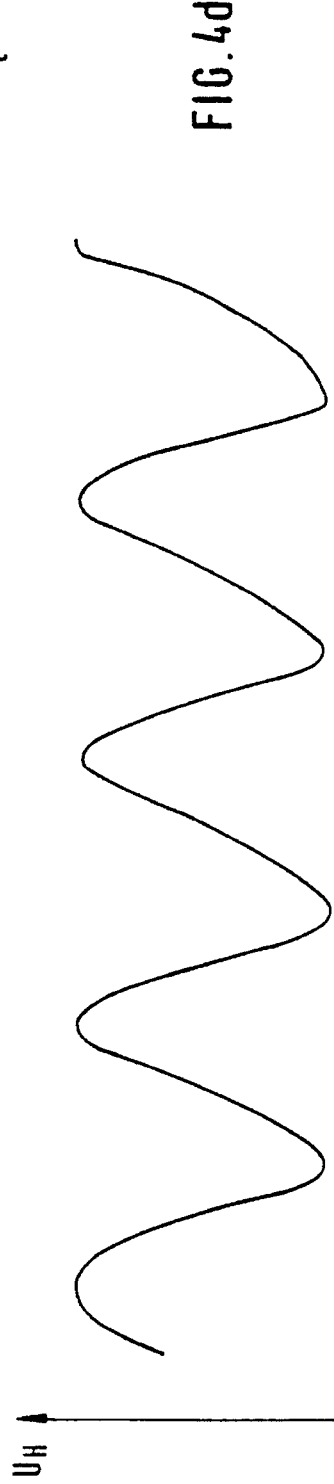

METHOD AND ARRANGEMENT FOR CONTROLLING AN INTERNAL COMBUSTION ENGINE

FIELD OF THE INVENTION

The invention relates to a method and an arrangement for controlling an internal combustion engine of a motor vehicle.

BACKGROUND OF THE INVENTION

In modern control systems for internal combustion engines, the fuel quantity to be injected is determined on the basis of the air flow drawn into the engine. This quantity of fuel is pregiven by the driver via a control of the throttle flap which is achieved via a mechanical and/or electrical path. When the air flow is adjusted in dependence upon the command of the driver, the clocked operation of the engine is not considered and the throttle flap is held fixed in a predetermined position when the command of the driver remains constant. An engine equipped with this conventional control system, however, exhibits an unsatisfactory operating performance in various operating ranges and requires a high complexity with respect to the control and/or the components used.

This unsatisfactory operating performance relates, for example, to: (a) the trace of the torque in the full-load range supplied by the engine which shows dips for specific conditions in specific rpm ranges; (b) the efficiency of the preparation of the mixture in central injection systems which preparation is affected by the injection of the fuel onto the positioned throttle flap through which reduced air flow occurs especially in the lower load range with the mixture being unsatisfactory because of the wetting of the throttle flap; (c) the correction of the uniform fluctuations and other effects specific to a cylinder such as small fluctuations of the exhaust-gas composition and the like; these fluctuations must be corrected by intervening in the metering of fuel or in the ignition on the basis of comprehensive control programs; and, (d) the idle control where high resolution position sensors must be utilized because of the necessary precision for control via the main throttle flap.

U.S. Pat. No. 4,571,990 discloses that the ranges of increased backflow of air in the intake pipe can be detected with the aid of the reversal points of a signal supplied by an air-mass sensor.

U.S. Pat. No. 4,688,535 discloses measures for improving the smooth running of an engine wherein the uniform running of the cylinders is checked on the basis of a crankshaft signal and the cylinder or cylinders which depart from this uniform running can, if required, be detected and the uniform running can be reestablished by intervening in the metering of fuel.

U.S. Pat. No. 4,452,200 discloses an idle control equipped with a position control of the main throttle flap.

SUMMARY OF THE INVENTION

In view of the foregoing, it is an object of the invention to provide a method and an arrangement for controlling an internal combustion engine wherein the operating performance of the engine is optimized.

This is achieved in that the air flow to the engine is influenced electrically at least in component ranges. This operation on the air flow at least in component regions takes place in a selected time frame with respect to operations on the engine. The metering of air and the engine are synchronized with respect to each other by the procedure provided by the invention so that the operating performance of the engine is significantly improved.

The backflow component of the air can be reduced especially in the full-load range by means of a clocked drive of an actuator influencing the air supply. In this way, the maximum obtainable power is increased. The application of the synchronization in the range of the full-load resonance of the air pulsation in the intake channel is especially advantageous.

Special advantages are provided by influencing the air flow selectively with respect to the cylinders especially in the full-load range. In this way, improvements are provided with respect to knock sensitivity of the engine by means of an improved distribution of the mixture. In addition, an improvement of the smooth running of the engine and the uniform running of all cylinders can be obtained by adjusting a uniform distribution of the air supply for all cylinders and/or a reduction of the cylinder head temperature of critical cylinders can be obtained.

In general, the necessary air quantity can be metered very precisely with respect to individual cylinders by the procedure provided by the invention and small fluctuations, for example, of the exhaust-gas composition can be controlled out by influencing the air with respect to individual cylinders.

An improvement of the mixture of fuel and air and the distribution of this mixture can be achieved especially in the lower load range in an advantageous manner by the procedure according to the invention of synchronizing the metering of air and the engine with each other via a clocked opening of the throttle flap in the region of the open injection valve for central injection systems.

In addition, the procedure provided by the invention permits the reduction of angle resolution of the throttle-flap sensors in the area of idle control without the quality of the idle control being affected.

Special significance is imparted to the procedure of the invention with the advantageous use of individual throttle flaps for each cylinder. This permits smaller and faster positioning motors because of the reduced size. In addition, the throttle losses are reduced while wetting is reduced and complex camshaft control for adjusting the opening of the inlet and/or outlet valves can be omitted because of the control of the individual flaps with this control being synchronous with the engine and individual to the cylinders. The above-described advantages are likewise obtained by means of the use of the individual flaps.

BRIEF DESCRIPTION OF THE DRAWINGS

The invention will now be explained with reference to the drawings wherein:

FIG. 4a shows the output signal of a crankshaft inductive sensor as a function of time;

FIG. 4b shows the drive signal applied to an actuator of the throttle flap as a function of time;

FIG. 4c is a waveform showing the changes in position of the throttle flap as a function of time; FIG. 4d is a curve of the air flow as a function of time wherein backflow components are substantially avoided;

DESCRIPTION OF THE PREFERRED EMBODIMENT OF THE INVENTION

The basic idea of the invention is to influence the supply of air in a manner synchronous to the operation of the engine at least in one operating range of the engine. The air is preferably acted upon by an electrically controllable throttle flap. An overview block circuit schematic is provided in FIG. 1 and shows an engine control system for carrying out the invention.

Figure 1:
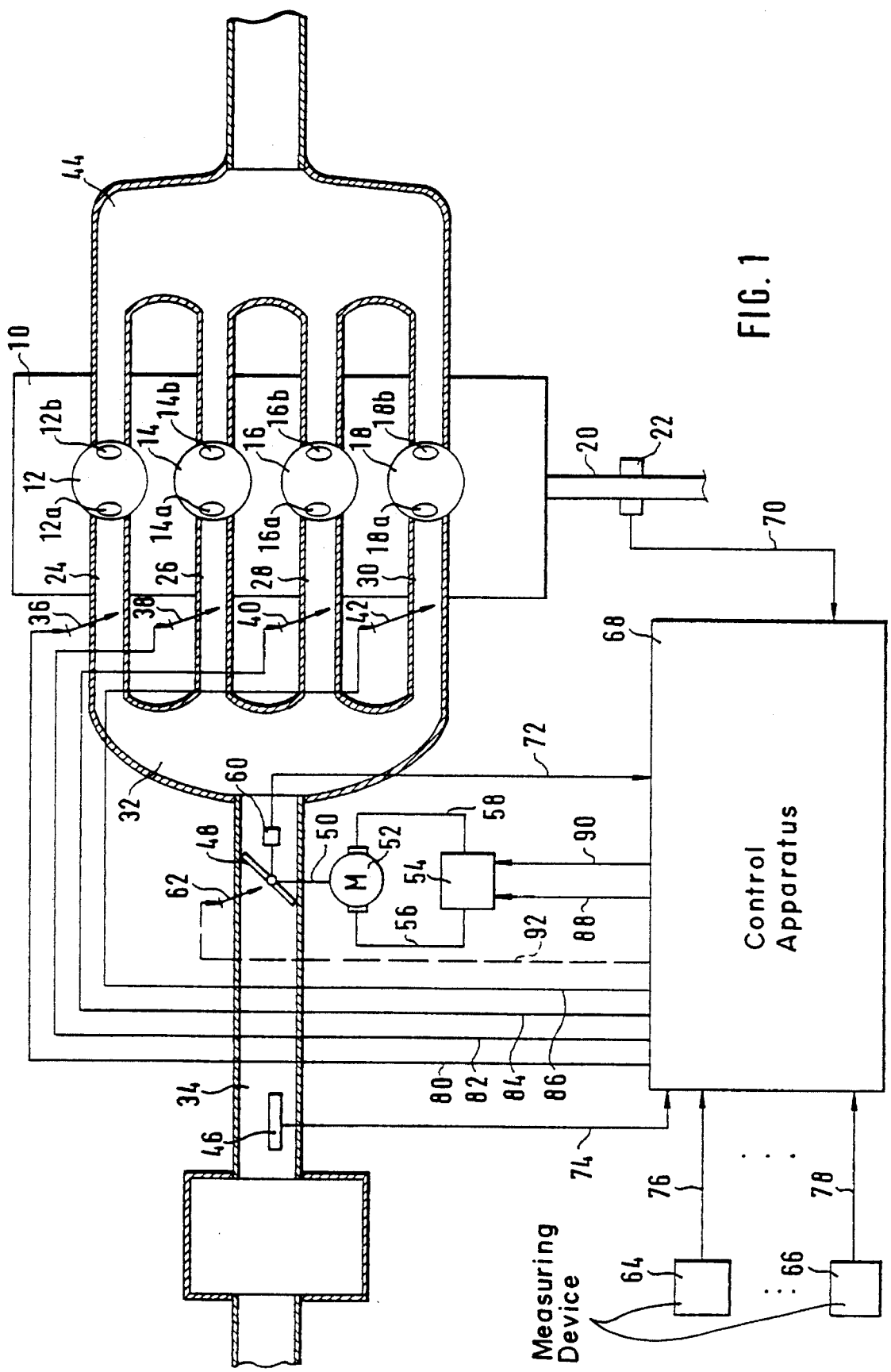
FIG. 1 is an overview schematic block diagram of an engine control system for carrying out the method of the invention.

FIG. 1 shows an engine 10 having four cylinders (12, 14, 16 and 18). Each cylinder includes an inlet valve (for example, 12A to 18A) and outlet valves (for example, 12B to 18B). In addition, the engine 10 includes a crankshaft 20 on which a measuring device 22 is mounted for detecting the engine rpm and for determining the power strokes of the particular cylinders. The measuring device 22 is preferably an inductive sensor. In lieu of or in addition to the measuring device 22 on the crankshaft, a measuring device can be provided on the camshaft (not shown) of the engine.

The air/fuel mixture is supplied to each cylinder via ram pipes 24 to 30 which lead from an intake manifold 32. The intake pipe 34 opens into the manifold 32. In a multi-point injection apparatus, a plurality of injection valves 36 to 42 are assigned to respective ones of the ram pipes 24 to 30 for metering fuel to the respective cylinders. The engine 10 includes an exhaust system 44.

An air-mass or air-quantity measuring device 46 as well as a throttle flap 48 for controlling the air supplied to the engine 10 are provided in the intake system 34 of the engine 10. The measuring device 46 can, for example, be a hot film air-mass sensor or a hot wire air-mass sensor or the like. The throttle flap 48 is then connected to an electric motor 52 via a mechanical connection 50. The electric motor 52 is supplied with current from a drive circuit 54 via the lines 56 and 58. In addition, the throttle flap 48 is equipped with a position transducer 60 for detecting the position of the throttle flap.

In the case of a central fuel injection, an injection valve 62 is provided for metering fuel for all cylinders. The injection valve 62 is mounted in the region of the intake system 34 on the side of the throttle flap 48 facing away from the engine.

In addition, measuring devices 64 to 66 are provided for detecting additional operating variables of the engine or motor vehicle.

Also, an electronic control apparatus 68 is shown in FIG. 1 which includes the following input lines. A first input line 70 connects the control apparatus 68 to the measuring device 22 while a second input line 72 connects the control apparatus 68 to the position transducer 60. A third input line 74 connects the control apparatus 68 to the air-mass or air-quantity measuring device 46 and further input lines 76 to 78 connect the control apparatus 68 to the measuring devices 64 to 66, respectively. The control apparatus 68 includes several output lines for carrying out the control functions. The output lines of the control apparatus 68 include: output lines 80, 82, 84 and 86 connected to respective injection valves 36 to 42. Output lines 88 and 90 connect the control apparatus 68 to the drive circuit 54 for controlling the electric motor 52 in both directions of movement. Alternately, and in the case of central injection, an output line 92 can be provided in lieu of the lines 80 to 86 via which the injection valve 62 is actuated.

In addition, the control apparatus 68 can have tasks in connection with carrying out the adjustment of ignition and the control of the transmission and the like which are not described herein.

The control apparatus 68 directs the control of the fuel metering in a manner known per se as well as the adjustment of the throttle flap 48, for example, in the context of an idle control, an electronic accelerator pedal system, an anti-skid control and engine braking torque control or a road-speed controller.

All of these applications have in common that the throttle flap 48 is set in correspondence to a pregiven control program which runs in the control apparatus 68 and which is completely independent of the operation of the engine 10 and especially of the clocked operation of individual cylinders. This causes the unsatisfactory performance mentioned initially. According to the invention, the throttle flap 48 is driven in such a manner that the metering of air to the engine takes place synchronously with respect to the operation of the engine at least in one operating state whereby the control of the engine can be optimized in many areas of application.

Figure 2:
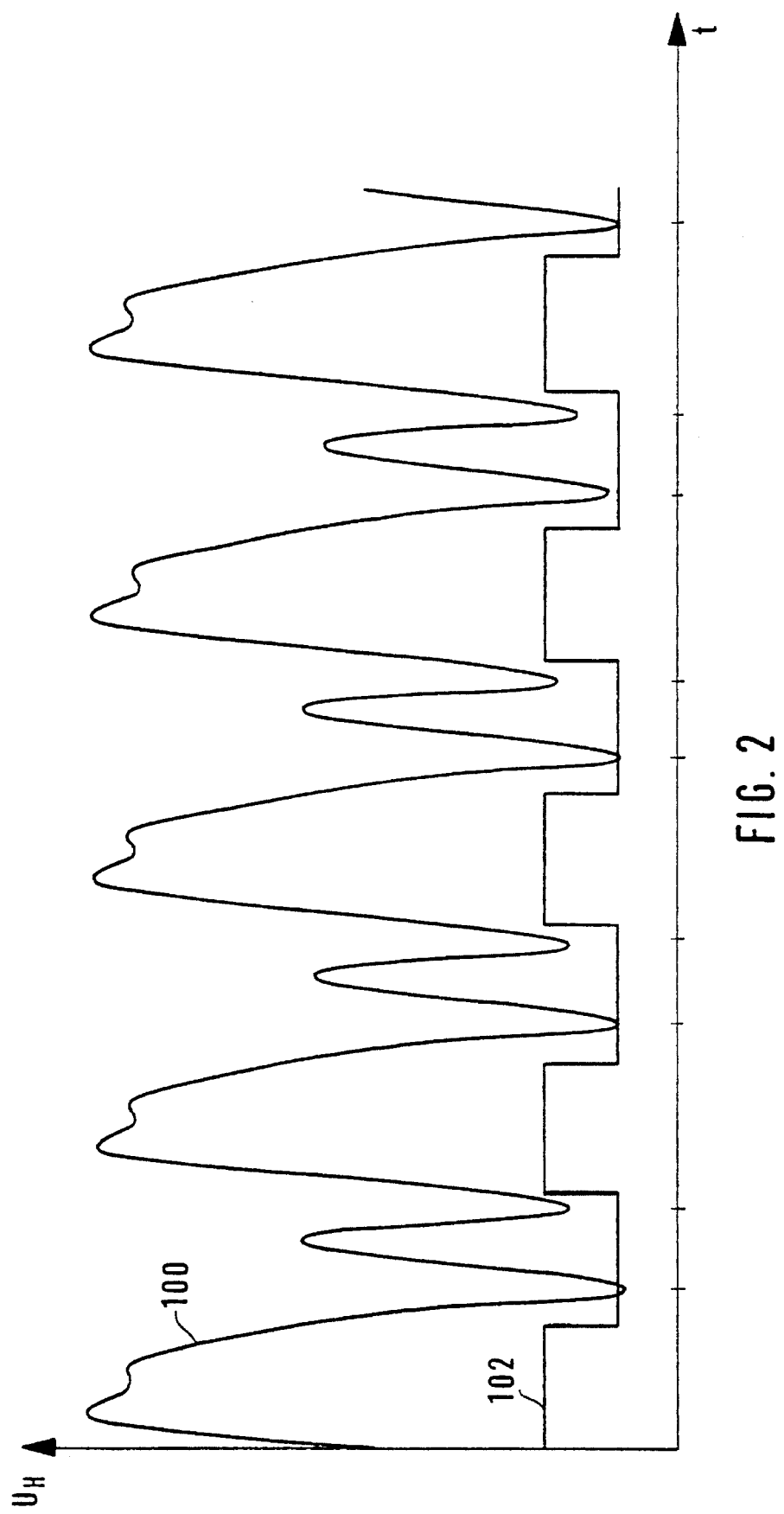
FIG. 2 is a graph showing the trace of the air mass or air-mass flow as a function of time.
Figure 3:
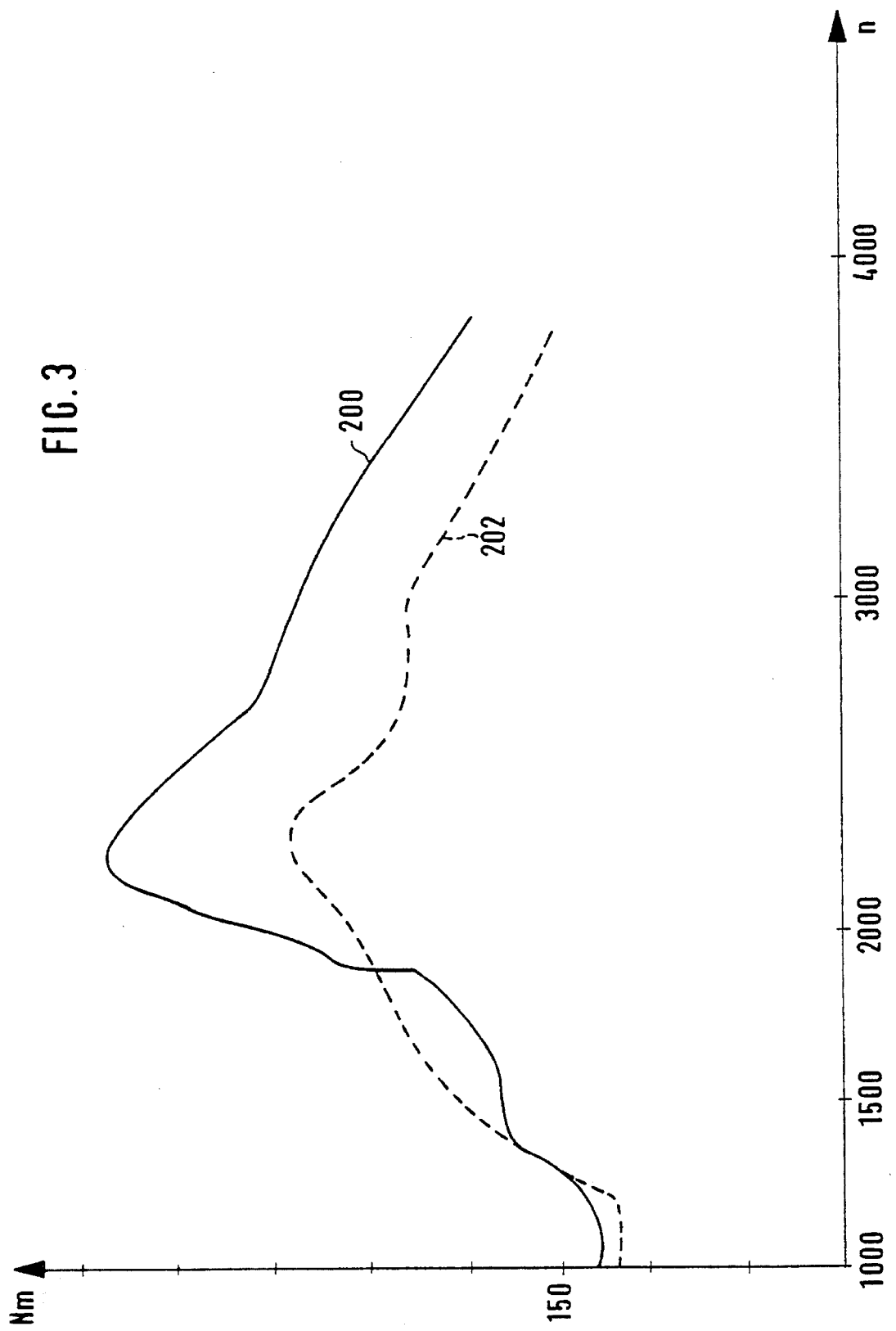
FIG. 3 is a graph showing the trace of the torque as a function of the rpm for different load conditions.

The problem associated with conventional control systems in the full-load range at full-load resonance is shown in FIGS. 2 and 3. In FIG. 2, the horizontal axis represents time while the vertical axis is provided for the signal of the air-mass sensor 46 as well as for the signal of the crankshaft transducer 22. The signal trace shown in FIG. 2 is known from the state of the art referred to above. The signal 100 of the air flow has two maximums in the range of one period of the crankshaft signal 102. The maximum later in time represents the backflow of the air in the intake channel caused by the resonance phenomena in the intake system. The backflow of air occurs at resonance in the intake system of the engine and is desired for special rpm for increasing power. In extreme cases, the backflow component can be up to 80% of the flow moving in the direction of the engine. This effects a reduction of the air/fuel charge of the cylinder and therefore leads to a reduction of power. Accordingly, and for a special engine, the maximum engine power did not occur with the flap fully open (979 mbar intake pressure); instead, the maximum engine power occurred somewhat therebelow (at 959 mbar). The magnitude and position of the backflow is then dependent on rpm and on load. This can be seen in FIG. 3 wherein the rpm is plotted horizontally and the torque of the engine is plotted along the vertical axis. The characteristic line 200 shows the rpm-dependent torque trace at full load (throttle flap completely open); whereas, the broken characteristic line 202 shows the rpm-dependent torque trace in the lower load ranges. It is noted that the torque of the solid characteristic line 200 compared to characteristic line 202 is less in the rpm range between 1,500 and 2,000. This leads to an unwanted dip in power in the full-load range.

According to the invention, the unwanted dip is avoided by means of an engine-synchronous drive of the throttle flap whereby a throttling of the air flow takes place with reference to the crankshaft angle in the area of the backflow. The backflow is impeded and the charge of the cylinder, the torque or the power in the rpm range between 1,500 and 2,000 rpm is increased at full load.

The principal embodiment of the invention is shown in FIGS. 4a to 4d. FIG. 4a shows the time-dependent trace of the crankshaft signal while FIG. 4b shows the time-dependent trace of the throttle flap drive signal. FIG. 4c shows the time-dependent trace of the throttle flap angle and FIG. 4d shows the resulting time-dependent trace of the air flow in the intake pipe.

FIG. 4a shows the engine-synchronous rectangular signal of a crankshaft segment transducer. FIG. 2 shows that the backflow bears a fixed time reference to the crankshaft position. On this basis, the throttle flap is driven in a clocked manner according to FIG. 4b so that the flap is actuated in the direction of closure in the region of the backflow. The extent of the closure movement can be selected in dependence upon operating variables and the start and end of the closure movement can be undertaken in synchronism with the crankshaft or on the basis of the air-mass or air-quantity signal. The backflow is impeded by the closure movement of the throttle flap and the backflow component is at least reduced so that the charge for the particular workstroke for the cylinder can be correspondingly increased. The schematically shown trace of the air flow in FIG. 4d is arrived at from the sinusoidally-shaped position change of the throttle flap of FIG. 4c based on the drive undertaken in accordance with FIG. 4b. In this way, the backflow component can be substantially prevented. The torque trace adapts itself to the broken-line curve of FIG. 3 in the decisive rpm range in this case. With this measure, the operating performance of the engine is significantly improved by the increased power in the full-load range.

In summary, the procedure provided by the invention has its basis in an engine-synchronous modulation of the throttle flap position which, proceeding from the throttle flap position preset by the driver, provides for a closure of the throttle flap by a pregiven amount in the range of the backflow to the expected.

Figure 5:
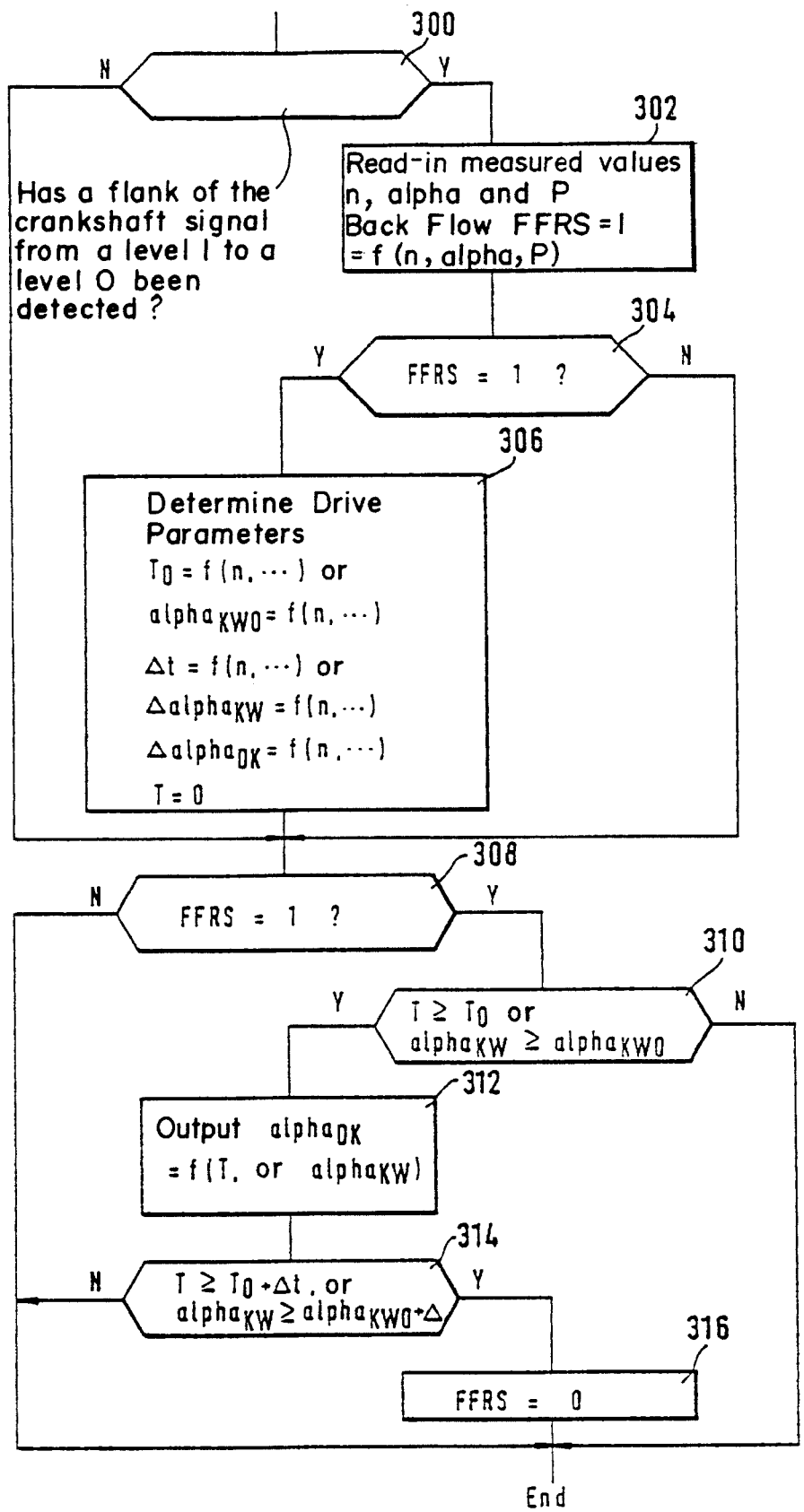
FIG. 5 shows a flowchart for a first embodiment of the invention wherein power is increased at full-load resonance.

A flowchart is shown in FIG. 5 for realizing the motor-synchronous, clocked drive of the throttle flap via an rpm-load characteristic field with reference to the crankshaft.

The subprogram is run through, for example, in the time pattern of approximately 1 millisecond or an angle pattern of approximately 1° crankshaft. After this subprogram is started, a check is made in a first inquiry step 300 as to whether a flank of the crankshaft signal from 1 to 0 level had been detected. This triggers an interrupt for continuing the subprogram further. In the next step, and after detection of the flank of the crankshaft signal 302, measured values of rpm, load, throttle flap angle and intake pressure are read in and a determination is made with an rpm/load characteristic field as to whether the operating state of the engine permits a backflow to be expected (in the motor type above, for example, full load and rotational speed between 1,500 and 2,000 rpm). In this case, the mark FFRS is set to 1 and, in the next step 304, a check is made as to whether this mark is set. If this is the case, then a backflow is expected and the control of the throttle flap in accordance with the invention is carried out. This control will be described in the following.

In the opposite case and when no detection of the flank is made in step 300, the program is continued with step 308 explained below.

If however a backflow is expected, then the drive parameters for the throttle flap are determined in step 306. In this step, the parameters in question are for determining the drive signal. In a preferred embodiment, a crankshaft synchronous start time point or start crankshaft angle as well as the duration of the drive are determined which could lead to a modification of the metering of the air pursuant to the invention.

The drive signal parameters as the backflow itself are dependent upon the engine rpm and upon disturbance variables such as intake pressure, throttle flap position, atmospheric pressure, et cetera. The parameters are read out in step 306, for example, from characteristic fields. The duration of the drive of the throttle flap is dependent upon the width of the backflow which is likewise a function of the rpm and the above-mentioned disturbance variables. A pregiven time duration or a pregiven crankshaft angle can be parameters for the duration of the drive in dependence upon the embodiment. This drive signal parameter too can be determined by means of characteristic fields.

In addition, a measure for the angle is determined in step 306 through which the throttle flap is maximally displaced in the direction of closure under the pregiven circumstances. In an advantageous embodiment, this measure can be a fixed value and in other embodiments can be dependent upon the operating variables mentioned above read out of the characteristic field. Furthermore, a counter or a crankshaft base angle is set to zero and the program is continued with inquiry step 308 as in the case of a negative answer in steps 300 and 304.

The determination of the drive signal parameter takes place in a preferred embodiment in such a manner that the closure movement of the throttle flap follows the signal trace of the backflow according to FIG. 2 (see also step 312), so that, ideally, the backflow is suppressed completely or partially. In this connection, the determination of the angle is shown by which the throttle flap is maximally displaced. This corresponds essentially to the maximum or partial value of the backflow under pregiven operating conditions. In other embodiments, the drive signal parameters can be pregiven in a simple manner such that a wave-shaped movement of the throttle flap results by means of which the backflow is significantly impeded.

Generally, a reduction can take place in advance of the backflow and can provide power advantages. This occurs because of the spatial distance between flap and valve.

In step 308, the mark FFRS for the backflow is again checked. If this mark is set, then the program continues with inquiry step 310; whereas, in the opposite case, the subprogram is ended and repeated in accordance with the pregiven time pattern.

If it is detected in step 308 that the mark is set for the backflow to be expected, then in step 310, an inquiry is made as to whether the counter position running simultaneously is greater than the start time value or start time angle value determined in step 306 for driving the throttle flap. This counter position represents the time which has run since the change of flank or the crankshaft angle through which the crankshaft has rotated since this point. If this is not the case, then there can still be no drive of the throttle flap and the subprogram is repeated at a pregiven time.

When the start of the drive for the throttle flap is reached, then the drive of the throttle flap is emitted in step 312, which follows step 310, in accordance with the parameters determined in step 306. The throttle flap drive signal or the throttle flap position desired value is then modified in accordance with a time function or a crankshaft angle function which leads to a trace of the position change which approximates the trace of the backflow under the pregiven operating circumstances so that the backflow is significantly reduced.

In the following inquiry step 314, a check is made as to whether the counter position or the base angle is equal to or greater than the drive end determined in step 306. If this is not the case, then the subprogram is repeated at a pregiven time and the drive of the throttle flap is maintained. However, if the drive end is reached or exceeded, then the mark for the drive is set to zero in step 316 and the drive of the throttle flap is again set to the original value in the case of an electronic motor power drive or is set to zero in the case of a mechanical power drive by the driver and the subprogram is repeated. In this way, a new drive of the throttle flap is undertaken at the latest during the next backflow.

The procedure described in FIG. 5 is for driving the throttle flap based on an rpm-load characteristic field with reference to the crankshaft angle. In lieu of this procedure of FIG. 5, the procedure of the invention also can be carried out by evaluating the air mass or air quantity signal (or also by evaluating an intake pipe pressure signal). This will be described with respect to FIGS. 6, 7 and 8.

Figure 6:
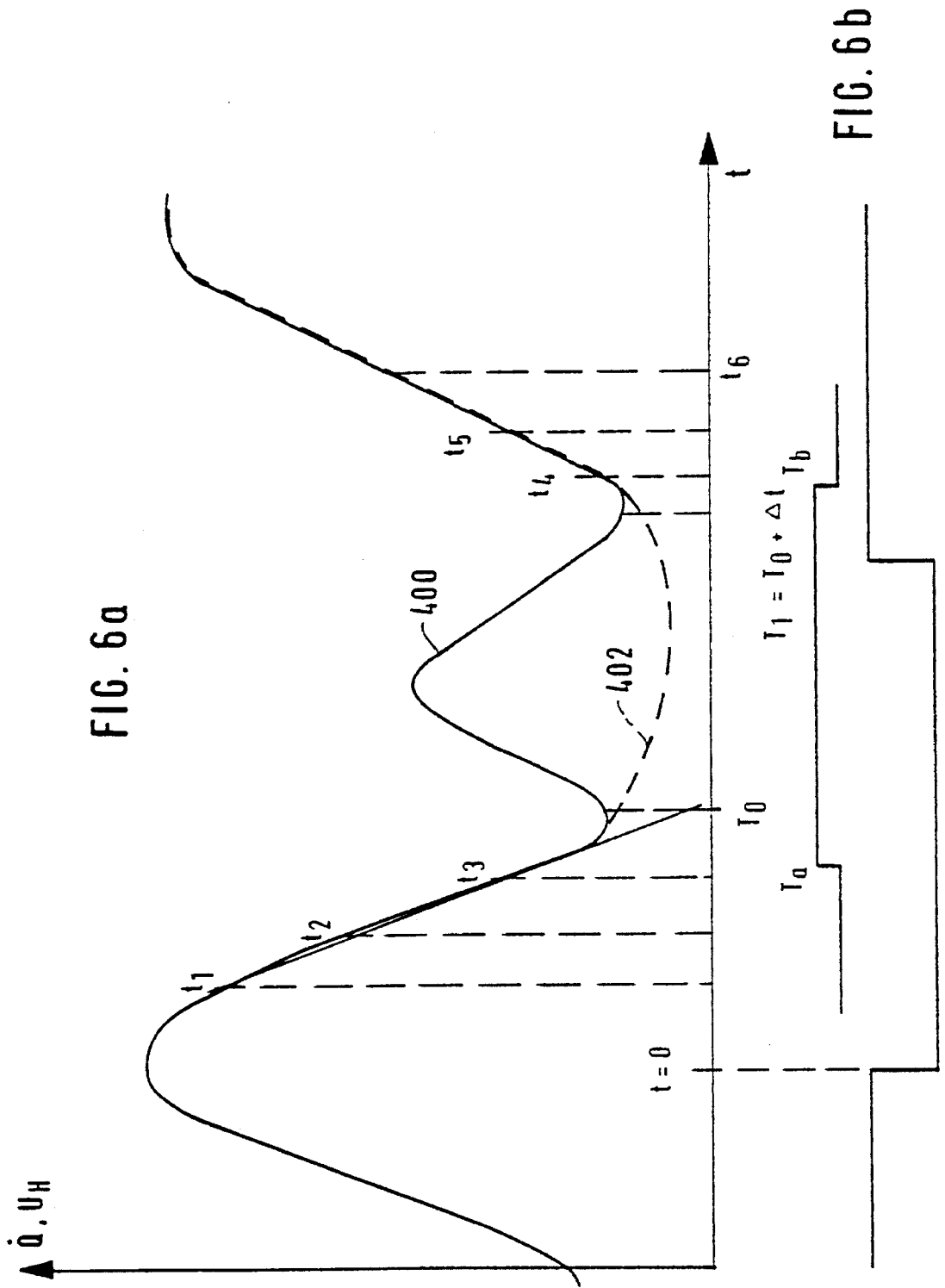
FIG. 6a shows the curve of a signal as a function of time with the signal being indicative of pressure, air quantity or air mass.
FIG. 6b shows the signal of a crankshaft sensor as a function of time.

In FIG. 6, the evaluation of the air signal known from the state of the art is briefly explained. In FIG. 6a, the trace of a signal representing the air quantity, air mass or pressure is shown as a function of time. Reference numeral 400 identifies this curve for backflow without influencing the throttle flap and reference numeral 402 shows this trace with backflow and with the throttle flap being influenced. FIG. 6b shows the crankshaft signal.

At time point T=0, a change of the throttle flap signal from positive to negative level takes place. The evaluation of the signal shown comprises that the so-called reversal point T0 is determined from the interpolation of the signal values at times T1, T2 and T3 as well as the point T1 (=T0+ΔT) from the signal values at time points T4, T5 and T6 rearwards; that is, from the previously occurring backflow. If the throttle flap position changes very rapidly because of a corresponding driver command, then, in a preferred embodiment, the time point T1 can be corrected on the basis of the time derivative of the throttle flap angle since the engine operates for current pulsation in another operating range than previously with a slightly changed trace of the backflow.

A possible backflow region can be determined between times TA and TB within which the throttle flap is moved in the closure direction. In this connection, it is essential that the return of the throttle flap is so adjusted and the throttle flap is so caused to follow that an air flow through the measuring element is guaranteed to continue. Starting at time point T1, the throttle flap is opened to the full value or a value corresponding to the command of the driver; whereas, the closure operation is started at time point T0 for the case wherein T1 is greater than T0. A certain residual flow in the back direction is necessary in order to continue with carrying out the procedure of the invention even when the throttle flap is influenced.

Figure 7:
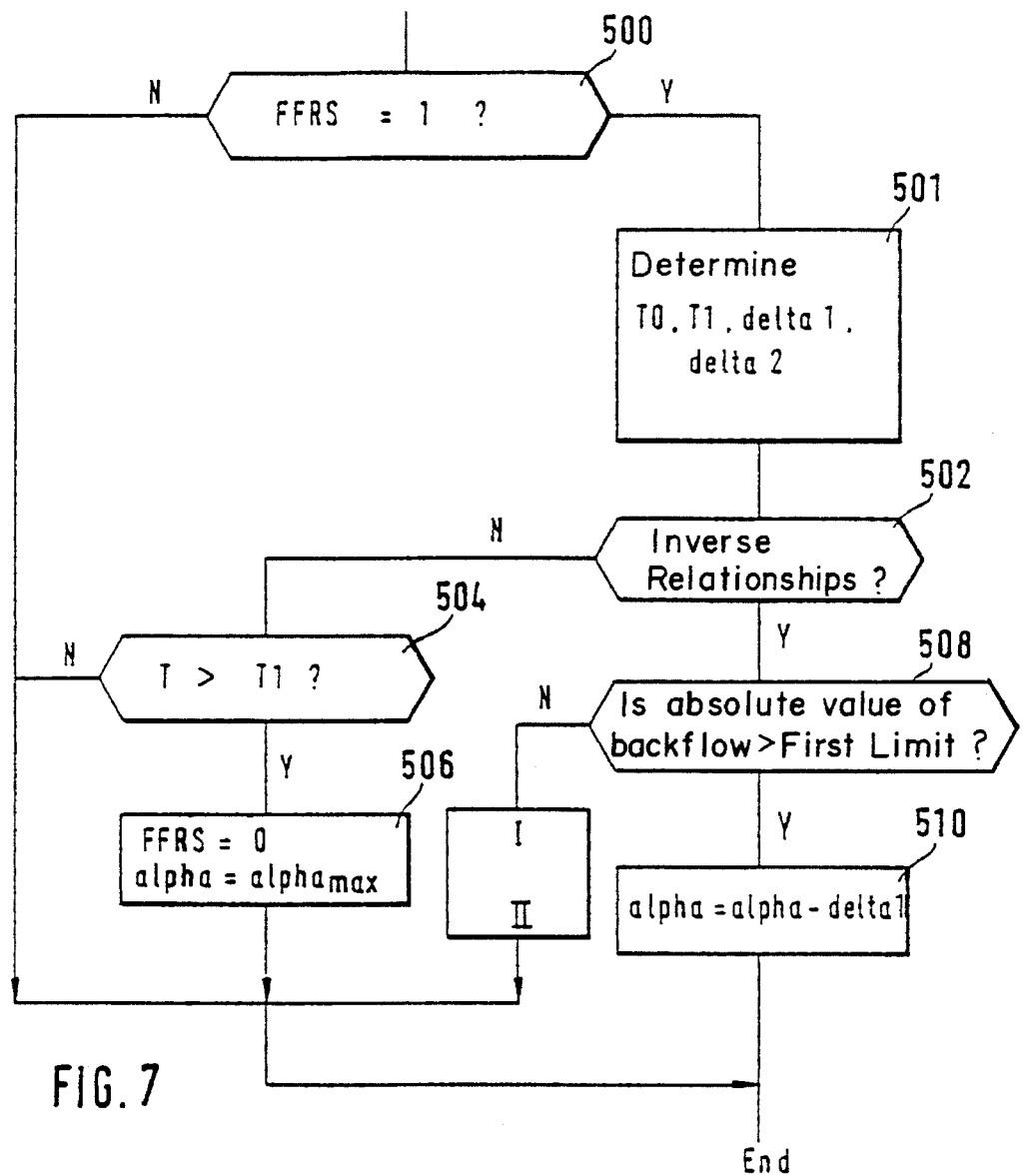
FIG. 7 is a flowchart showing a preferred embodiment of the invention.
Figure 8:
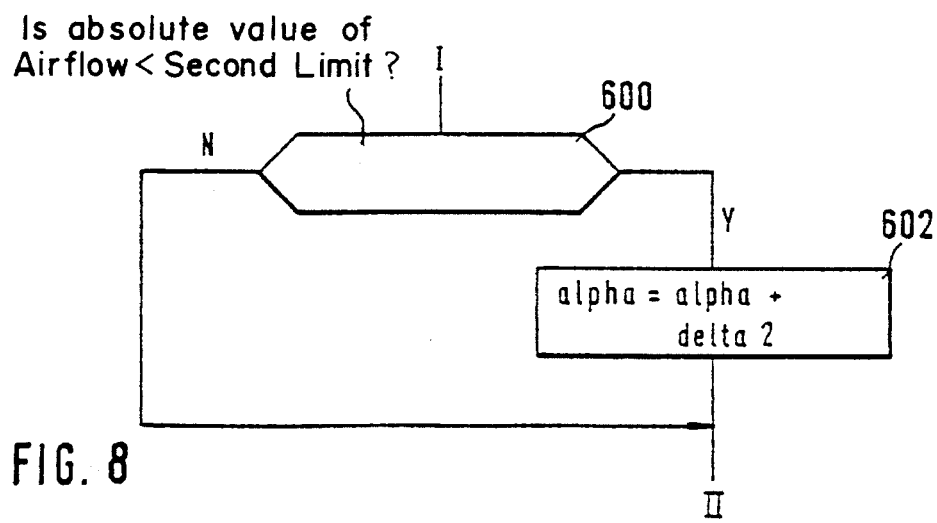
FIG. 8 shows a block of the flowchart of FIG. 7.

FIGS. 7 and 8 show a preferred embodiment of the method of the invention for influencing the throttle flap in the form of a flowchart. This method will now be explained.

After the start of the subprogram, a check is made of the mark FFRS for the backflow to be expected in a first inquiry step 500. The mark is set as explained with respect to FIG. 5 by the change of the flank of the crankshaft signal and by evaluation of various operating variables. If this mark is set, the above-mentioned values T0 as well as the amount Δ of the throttle flap angular change are determined as described with respect to FIG. 5 and T1 is read in and a check is made in step 502 as to whether the described evaluation of the air signal resulted in the presence of the inverse relationships; that is, whether the time point T0 has been reached. If this is not the case, then a check is made in inquiry step 504 as to whether the time after the flank change of the crankshaft signal is greater than the time point T1 which has been determined in the manner described above. If this is not the case, then (as in the case of a mark which has not been set) the subprogram is repeated in step 500 at a pregiven time (1 msec or 1° crankshaft angular pattern). If it is recognized in step 504 that the time is greater than the time T1 from the previous pulsation, then the mark FFRS is set to zero in step 506 and the desired value of the throttle flap position is set to the maximum value in the full-load range; otherwise, the mark is set to the value determined, as required, on the basis of the driver command or, for a control via precontrol of the position signal, the mark is set to zero and thereafter the subprogram is repeated at a pregiven time.

If it is recognized in step 502 that inverse relationships are present, that is, that the time point T0 is reached, then in the next inquiry step 508, a check is made as to whether the absolute value of the backflow is greater than a pregiven first limit. If this is not the case, then the program is continued in accordance with FIG. 8 and the subprogram is thereafter repeated at a pregiven time.

If the absolute value of the backflow is greater than the first limit, then in the next step 510, the throttle flap angle α is reduced by a pregiven amount Δ1 so that at least a residual flow remains in the inverse direction in the region of the second limit value described below and thereafter, the subprogram is ended.

If the absolute value of the air flow according to step 508 drops below the first limit, then, according to FIG. 8, the absolute value of the airflow is compared to a second limit which is less compared to the first limit in the next inquiry step 600. If the absolute value does not drop below this second limit, then the subprogram is repeated; that is, this reduction is maintained when there is a reduction of the throttle flap angle; whereas, when there is a drop below the second limit, an opening of the throttle flap by a pregiven amount Δ2 takes place in accordance with step 602 and thereafter the subprogram is ended.

The described procedure leads to a reduction of the throttle flap position between the regions T0 and T1 when there is a backflow present so that the backflow is impeded and the torque and power of the engine are increased.

An additional advantage of the backflow suppression in accordance with the invention is that the influence of a camshaft displacement which leads to a shift of the backflow maximum in comparison to the crankshaft position, can be detected via the hot-wire or hot-film signal. In this way, an optimization of the displacement of the camshaft can take place.

Pressure signals can be applied in lieu of the hot-wire or hot-film signal for selecting the backflow. For example, the following can be used: a standard pressure sensor above the throttle flap, a difference pressure sensor above the throttle flap or an intake pressure sensor.

In addition, the displacement can also be undertaken via an optimizer with precontrol with the drive signal parameters being determined on the basis of a measurement of the backflow up to its disappearance.

Figure 13:
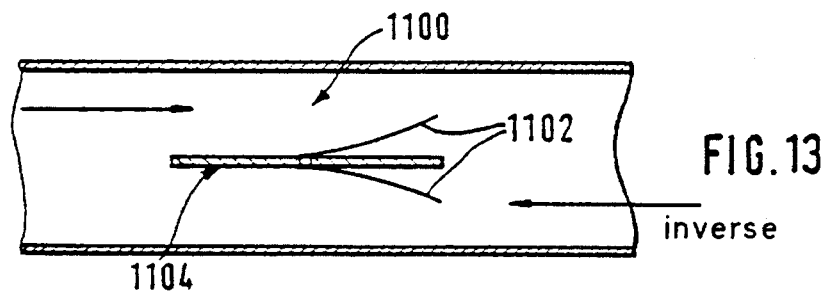

A comparable effect is exhibited by an engine-synchronous influencing of the air supply via mechanical means in accordance with FIG. 13. Here, a subsequently mounted nonlinear directional-dependent flow resistor is shown in the intake pipe 1100 via one or more flow-directional dependent ancillary flaps 1102 on the throttle flap 1104. The flaps lie directly on the throttle flap and do not influence the air flow from the air filter to the engine when there is a positive air flow toward the engine (in FIG. 13, from left to right). The ancillary flaps have a low mass. The low mass effects a rapid reaction of the flaps when there is a backflow with the backflow causing the ancillary flaps to rise so that an increased flow resistance occurs from the engine toward the air filter and the backflow is impeded. The ancillary flaps can be mounted at any desired position in the intake pipe independently of the throttle flap, for example, in the ram pipes of the cylinders. In addition, one or more ancillary flaps can be used. It is especially advantageous when two mutually-opposite lying flaps are used. A lifting via an intense underpressure is then avoided when the throttle flap is closed.

The procedure provided by the invention achieves an increase of the power or of the engine torque in the area of full-load resonance. The procedure also provides advantages in other areas of application. In preferred embodiments, the procedure provided by the invention can be applied individually as well as in combination for increasing power in connection with idle control via the throttle flap while reducing the angular resolution of the throttle flap position sensor which has been necessary up until now (see FIG. 9). Also, the procedure provided by the invention can be applied in central injection systems to improve the mixture preparation at low load via clocked opening of the throttle flap in the region of the open injection valve (see FIG. 10). A further advantageous area of application is in connection with an engine-synchronous drive of the throttle flap with respect to individual cylinders, for example, when applying the procedure of the invention to obtain a uniform air supply for all cylinders with improvement of the uniform running of the engine and an improvement of the smooth running (see FIG. 11). Furthermore, a cylinder-selective influencing of the air flow can be provided by the procedure of the invention and especially in the full-load range which means an improvement with respect to knock sensitivity and which is characterized by a possibility of the reduction of the cylinder head temperature of critical cylinders. In addition, the procedure of the invention can be utilized to compensate for small fluctuations in the exhaust-gas composition (see FIG. 12).

In general, today's idle control is undertaken with much greater resolution especially for a control via the main throttle flap by means of a position control on the basis of detecting the position of the throttle flap. This high resolution requires a very precise position transducer which requires a high complexity in the area of the transducer and for the signal detection and signal processing. A clocked engine-synchronous drive of the throttle flap avoids this effort to a considerable extent. It is especially advantageous when the clocking of the throttle flap is undertaken in synchronism with the position of the inlet valves. In this way, possible floating oscillations of the air column are avoided as is an influence on comfort. The action of each ignition via rpm and lambda change is analyzed for idle control with engine-synchronous clocked drive of the throttle flap in order to determine the next drive of the throttle flap. In addition to the exhaust gas sensor, a crankshaft or camshaft transducer can operate for analyzing the effect of each ignition. The deflection of the throttle flap can principally take place about a center position in both directions either from a high emergency operating value in the direction of closure or from a low value in the direction of opening. A preferred embodiment is shown in FIG. 9.

Figure 9:
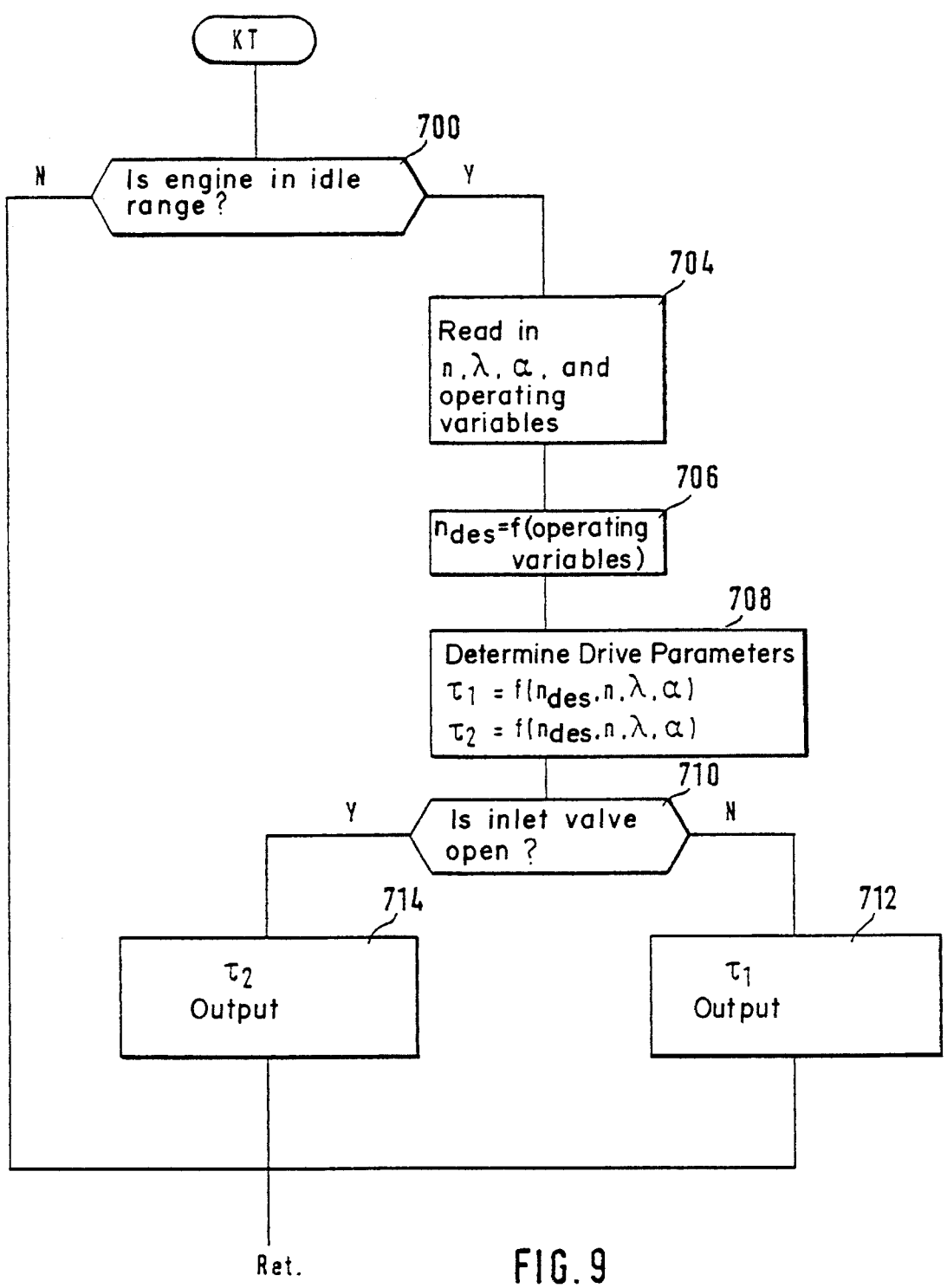
FIG. 9 is a flowchart showing another embodiment of the method of the invention in combination with an idle control.

The subprogram shown in FIG. 9 is called up in a fixed time pattern or angle pattern, for example, in a 1 millisecond pattern. In the first inquiry step 700, a check is made with respect to an idle switch and the road speed as to whether the engine is in the idle range. If this is not the case, then the subprogram is ended and repeated at a pregiven time.

If the engine is in the idle range then, according to step 704, the operating variables of engine rpm, throttle flap position, lambda and further operating variables such as engine temperature, transmission position, status of a climate control apparatus, battery voltage and the like are read in. In step 706, the rpm desired value of the idle control is determined in a manner known per se, for example, on the basis of a characteristic line or characteristic field. The rpm desired value of the idle control is determined on the basis of additional operating variables. In step 708, the drive parameters are then determined which are required for adjusting the desired rpm. These drive parameters include a first drive signal variable Tau1 dependent upon desired value, rpm, lambda and throttle flap position as well as a second drive signal variable tau2. In the next step 710, a check is made with the aid of the crankshaft signal or the camshaft signal as to whether the inlet valve of a cylinder is opened. If this is not the case, the throttle flap is adjusted on the basis of the first drive signal value tau1. If it is determined in step 710 that the inlet valve of a cylinder is open, a drive signal is generated with a second drive signal variable in step 714 and the throttle flap is adjusted on the basis of this signal. Thereafter, the subprogram is ended.

The result is thereby a clocked drive of the throttle flap for idle control. For an opened inlet valve, the throttle flap permits a greater or lesser air flow to the particular cylinder in accordance with the embodiment than would be the case when the inlet valve is closed. The magnitude of the drive signal value then determines the adjusted rpm which is essentially determined by the second drive signal parameter of the embodiment, for example, the pulse-duty factor or the magnitude of the current. The actual control parameter is then the second drive signal parameter so that the high resolution of the position transducer can be significantly reduced.

Figure 10:
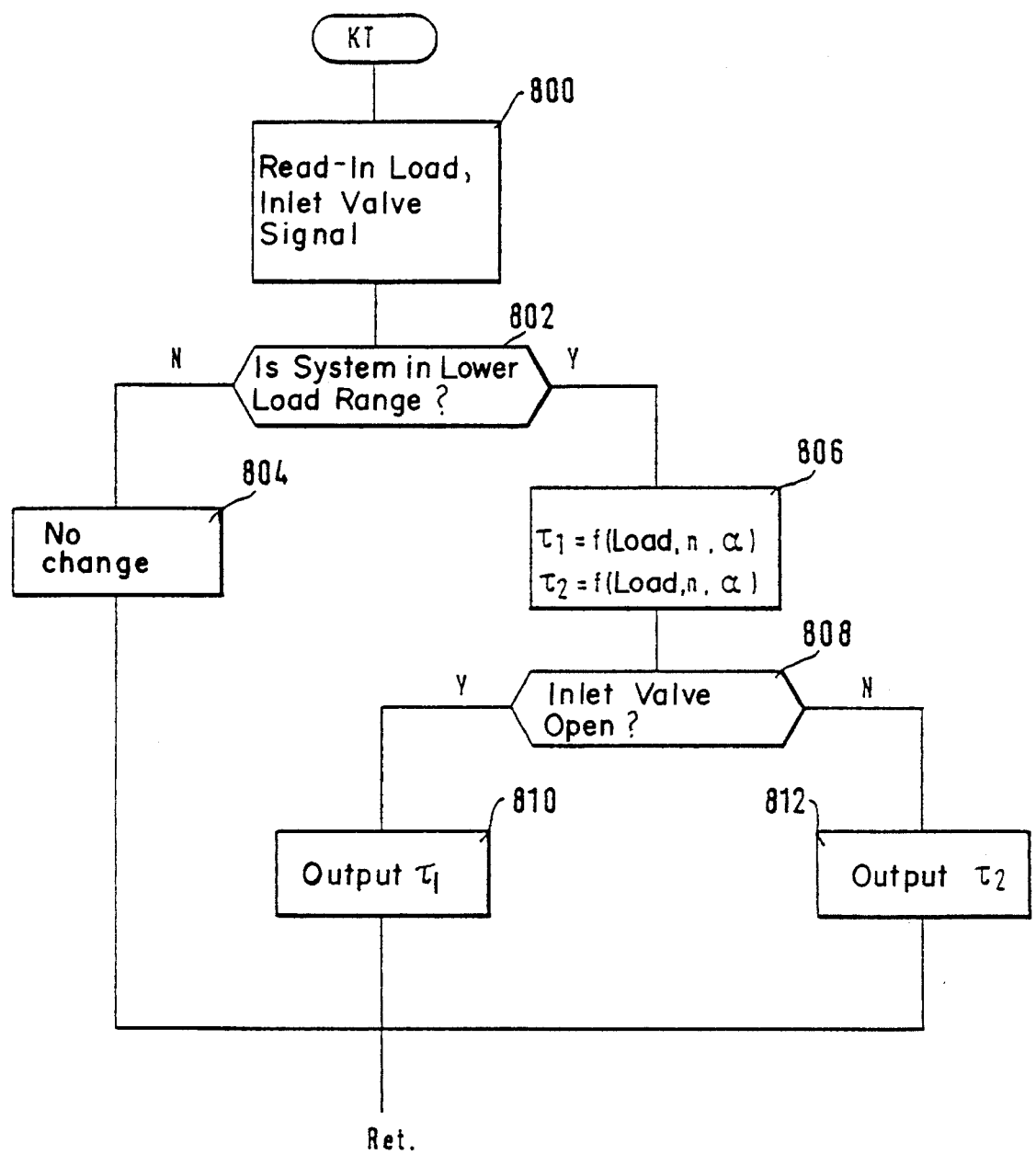
FIG. 10 is a flowchart of another embodiment of the method of the invention for improving a central injection apparatus.

An improvement of the mixture processing for central injection systems is obtained by means of the procedure provided by the invention in accordance with the embodiment of FIG. 10. The principle here is that for an open injection valve, the throttle flap is displaced in the direction of opening so that the injected fuel quantity does not adhere to the throttle flap to the extent as it does at present but instead is directed by means of increased air flow to the intaking cylinder (especially in the lower load range when the throttle flap is almost closed). In addition to the open injection valve, the throttle flap position is reduced so that the air flow set by the driver adjusts on average.

In the embodiment of FIG. 10, the subprogram shown likewise runs in a specific time pattern. In the first step 800, operating signals such as load, injection valve control, throttle flap angle, rpm et cetera are read in and in the next step 802, a check is made with the aid of these signals as to whether the system is in the lower load range. If this is not the case, no change 804 takes place, the throttle flap is adjusted in accordance with the driver command and the subprogram is repeated at a pregiven time.

If the system is in the lower load range then, according to step 806, a drive signal parameter tau1 is determined on the basis of the operating variables of load, rpm and throttle flap angle. This drive signal parameter is, for example, a pulse-duty factor, a frequency, a current value, et cetera and is for the opening drive of the throttle flap. A corresponding parameter tau2 is determined which causes a closing movement of the throttle flap and makes the desired air flow available together with tau1. In the next inquiry step 808, a check is made as to whether the injection valve is open. This takes place preferably with the aid of the drive signal of the valve. If this is the case, then, in accordance with step 810, the throttle flap is adjusted with the drive signal variable determined in step 806; that is, the throttle flap is opened by a specific amount and the subprogram is repeated at the pregiven time. If this is not the case, then, according to step 812, an adjustment of the throttle flap in accordance with tau2 takes place.

The procedure of the invention displays special advantages for a cylinder-selective influencing of the air flow. This is shown as an example in FIG. 11 for the improvement of the smooth running of the engine. A corresponding procedure can be applied for reducing the knock sensitivity for multi-point systems where, for an open injection valve, an increased air flow takes place and, for reducing the cylinder head temperature of individual cylinders.

Figure 11:
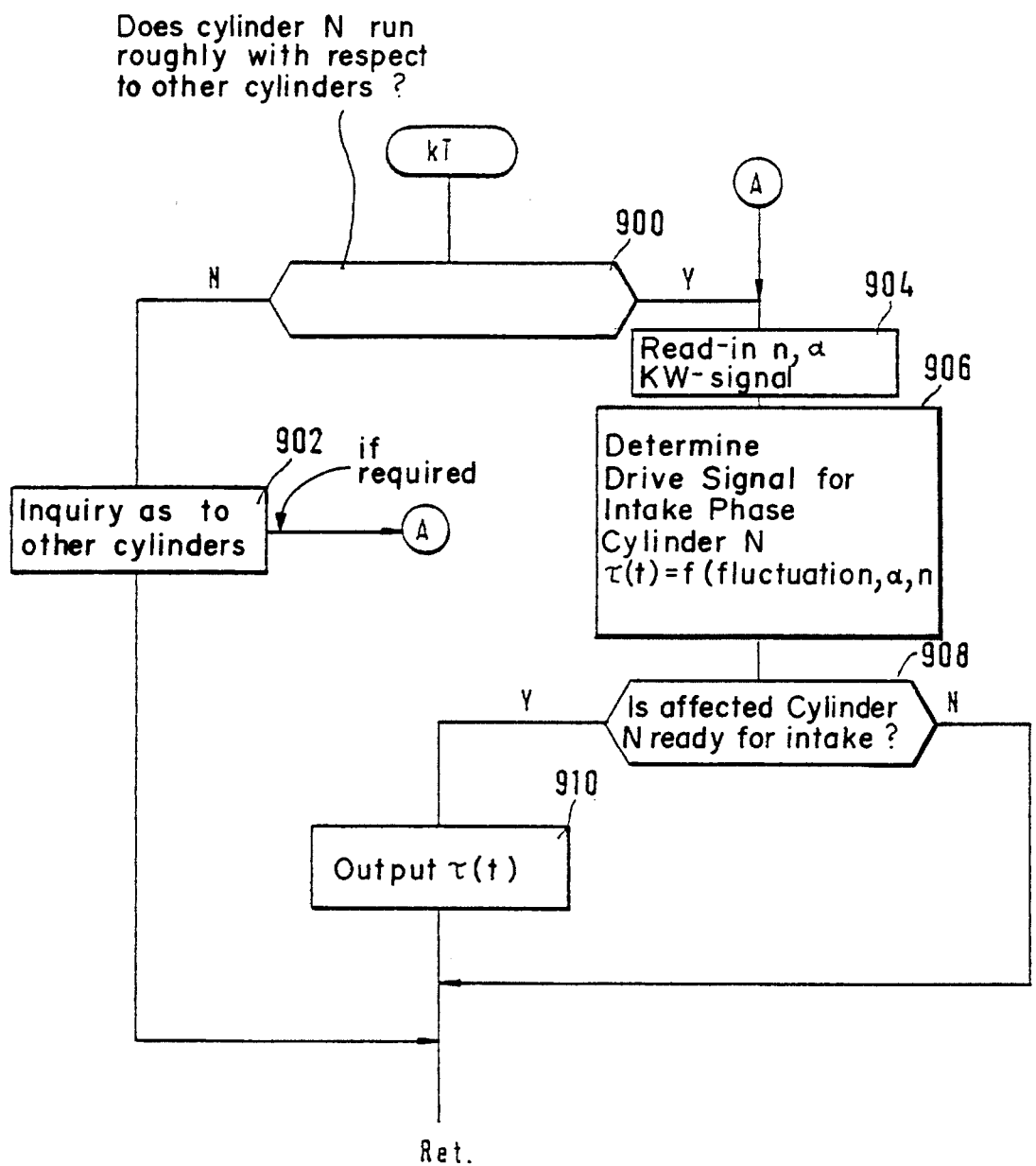
FIG. 11 is a flowchart showing another embodiment of the method of the invention in combination with a control of individual cylinders based on an example of compensating for rough running.

The subprogram of FIG. 11 is introduced in the fixed time pattern and a check is made in step 900 as to whether a first cylinder runs roughly with respect to the other cylinders. This determination takes place according to the above-mentioned known methods. If this is not the case, then according to step 902, comparable inquiries are undertaken with respect to the other cylinders. If it is recognized that one of the checked cylinders exhibits rough running, then operating variables such as rpm, throttle flap angle, crankshaft signal, et cetera are read-in in accordance with step 904 and, in step 906, the drive signal for the intake phase of the affected cylinder is determined. This drive signal is determined as a function of the throttle flap angle, the rpm and the sign and the extent of the fluctuation. In the next step 908, a check is made with respect to the crankshaft signal or camshaft signal as to whether the affected cylinder is ready for intake. If this is not the case, the subprogram is ended and repeated at a pregiven time. Otherwise, in accordance with step 910, the drive is emitted and the subprogram is repeated at a given time.

Figure 12:
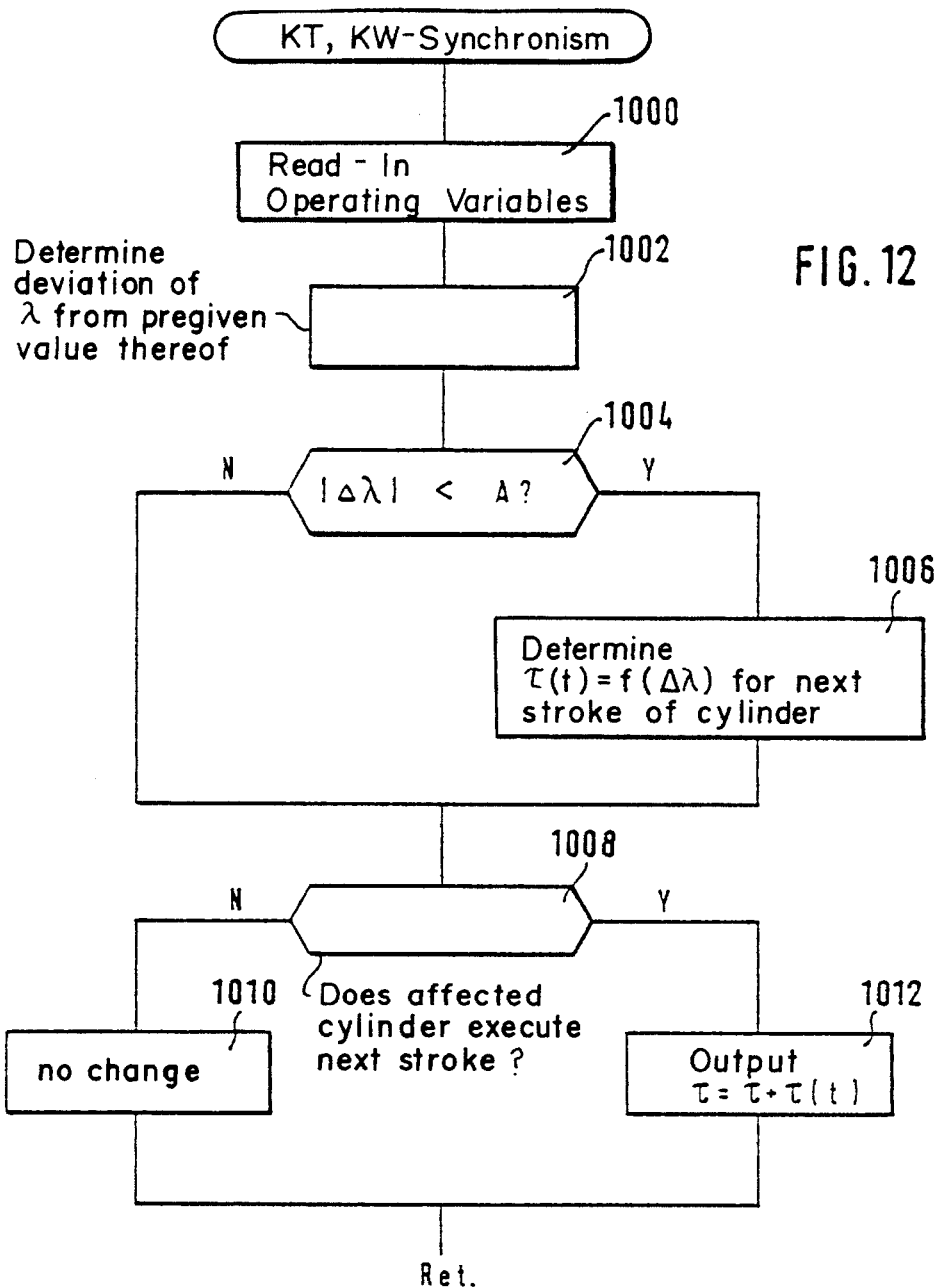
FIG. 12 is a flowchart which shows the method of the invention applied for controlling out small fluctuations in the composition of the exhaust gas; and, FIG. 13 shows a mechanical configuration for influencing the air flow in the full-load range where there is backflow.

A corresponding procedure can take place in an advantageous manner as shown in FIG. 12 in connection with small fluctuations of the exhaust-gas composition. After calling up the subprogram in a pregiven time pattern, operating variables such as lambda, crankshaft signal, et cetera, are read-in in accordance with step 1000 so that the exhaust-gas composition is detected on the basis of the combustion of an individual cylinder and the deviation of the lambda value from the pregiven value for the specific cylinder is determined in step 1002. If the amount of the deviation drops below a pregiven threshold value A in accordance with step 1004, then a small lambda fluctuation is detected and, according to step 1006, a corrective drive signal tau dependent upon the deviation is determined for the throttle flap for the next stroke associated with the particular cylinder. In the other case, the subprogram is ended for large lambda fluctuations. Step 1008 follows step 1006. In step 1008, a check is made with respect to the crankshaft signal as to whether the affected cylinder executes the next stroke. If this is not the case, then no change is undertaken in accordance with step 1010; whereas, when the next step is present, the drive signal for the throttle flap is emitted modified by the time-dependent component determined in step 1006 and thereafter, the subprogram is ended. In this way, a cylinder-selective influencing for small lambda fluctuations is possible.

In addition, and in a preferred embodiment, an electrically drivable flap can be provided in each ram pipe of each cylinder in lieu of a throttle flap in the intake pipe. In this way, a significantly improved influencing of the air flow is possible which is selective with respect to a cylinder so that a camshaft displacement is no longer necessary. All advantages of the individual applications can be achieved for engine-synchronous drive of the individual flaps in a like manner as described above.

It is understood that the foregoing description is that of the preferred embodiments of the invention and that various changes and modifications may be made thereto without departing from the spirit and scope of the invention as defined in the appended claims.

What is claimed is:

1. A method for controlling an internal combustion engine of a motor vehicle wherein the engine is equipped with a throttle flap adjustable to a setting by an operator of the vehicle for adjusting air flowing through an intake pipe to the engine, the method comprising the steps of:

providing a control unit for electrically actuating said throttle flap in dependence upon a command of the operator;

detecting the air flowing to the engine and supplying a signal indicative of the air mass;

evaluating said signal to detect a backflow of said air in said intake pipe; and, moving said throttle flap from and independently of said setting to close said throttle flap when said backflow occurs thereby preventing said backflow.

2. The method of claim 1, further comprising the step of influencing the air supplied to the engine by utilizing an electrically displaceable throttle flap which operates in clocked synchronism to the operation of the engine at least in component ranges.

3. The method of claim 2, wherein one of said component ranges is the full-load range and the method further comprises: the step of actuating the throttle flap in the direction of closure when the engine is operated in said full-load range and said backflow of the air takes place, said direction of closure being relative to a setting of said throttle flap outside of said full-load range.

4. The method of claim 3, wherein a throttle flap assembly includes said throttle flap and actuating means for actuating the throttle flap and the method further comprises providing a drive signal for said actuating means on the basis of at least one of a load-rpm characteristic field having reference to the crankshaft angle and on the basis of a signal characterizing the supply of air while determining the reversal point of the air flow.

5. The method of claim 1, wherein the engine is operated in the idle range and the method comprises the step of actuating the throttle flap in said idle range for controlling the idle rpm of the engine; and, actuating the throttle flap in such a manner that the actuation is controlled to proceed from a first position in the region of an open inlet valve of a cylinder in a direction toward a second position.

6. The method of claim 1, wherein the engine has a central injection system and one of said component ranges is the lower load range and the method comprises the step of controlling the throttle flap in the region of the open injection valve in the opening direction of the flap while a command of the driver remains constant while said engine is in said lower load range.

7. The method of claim 1, further comprising the step of actuating said throttle flap in such a manner that the supply of air is influenced individually for a cylinder for compensating for small fluctuations and so that a precise metering of air occurs.

8. The method of claim 1, further comprising driving said throttle flap when there are fluctuations in smooth running of the engine in such a manner to produce a smooth running of the engine during the intake stroke of the smooth-running cylinder or the non-smooth running cylinder.

9. An arrangement for controlling an internal combustion engine of a motor vehicle wherein the engine is equipped with a throttle flap adjustable to a setting by an operator of the vehicle for adjusting air flowing through an intake pipe to the engine, the arrangement comprising:

control means for electrically actuating said throttle flap in dependence upon a command of the operator;

detecting means for detecting the air flowing to the engine and supplying a signal indicative of the air mass;

said control means including means for evaluating said signal to detect a backflow of said air in said intake pipe; and, said control means including means for moving said throttle flap from and independently of said setting to close said throttle flap when said backflow occurs thereby preventing said backflow.

10. The arrangement of claim 9, wherein the air supply to the engine is adjusted electrically in at least component ranges and said control means includes an actuator corresponding to each cylinder and said control means includes means for influencing the supply of air at least in said component ranges in synchronism with said engine.

* * * * *